United States Patent
Neumeier (10) Patent No.: US 7,509,719 B2
(45) Date of Patent: Mar. 31, 2009

(54) METHOD AND DEVICE FOR LUBRICATING BEARING POSITIONS, ESPECIALLY IN MACHINE TOOLS OR THEIR PARTS

(75) Inventor: Manfred Neumeier, Esslingen (DE)

(73) Assignee: ESA Eppinger GmbH, Denkendorf (DE)

( * ) Notice: Subject to any disclaimer, the term of this patent is extended or adjusted under 35 U.S.C. 154(b) by 145 days.

(21) Appl. No.: 11/516,988

(22) Filed: Sep. 7, 2006

(65) Prior Publication Data
US 2007/0071381 A1  Mar. 29, 2007

(30) Foreign Application Priority Data
Sep. 10, 2005  (DE) .................. 10 2005 043 104

(51) Int. Cl.
*B23B 3/16* (2006.01)
*B23C 1/00* (2006.01)

(52) U.S. Cl. ............................. 29/40; 409/135

(58) Field of Classification Search ............ 29/39, 29/40, 38 B, 38 C, 27 C, 35.5, 33 P; 409/134, 409/135, 136, 137, 132, 231, 232
See application file for complete search history.

(56) References Cited

U.S. PATENT DOCUMENTS

| | | | | |
|---|---|---|---|---|
| 3,698,725 A | * | 10/1972 | Klabunde | 409/231 |
| 4,272,216 A | * | 6/1981 | Osburn | 409/132 |
| 4,303,360 A | * | 12/1981 | Cayen et al. | 409/233 |
| 4,519,734 A | * | 5/1985 | Mitchell et al. | 409/231 |
| 4,921,376 A | * | 5/1990 | Tani et al. | 409/131 |
| 5,096,347 A | * | 3/1992 | Kumagai et al. | 409/233 |
| 5,118,229 A | * | 6/1992 | Lyons et al. | 409/144 |
| 5,133,629 A | * | 7/1992 | Pfalzgraf et al. | 409/232 |
| 5,322,494 A | * | 6/1994 | Holtey et al. | 409/231 |
| 5,413,439 A | * | 5/1995 | Wu et al. | 409/232 |
| 5,487,631 A | * | 1/1996 | Child | 409/231 |
| 5,535,496 A | * | 7/1996 | Sugino et al. | 29/39 |

(Continued)

FOREIGN PATENT DOCUMENTS

DE  38 38 786  11/1988

OTHER PUBLICATIONS

Abstract of DE38 38 786, Inventor Glasser et al., Published Nov. 17, 1988, Controlled Oil-Mist Lubrication System Deposits Poloarised Droplets Only on Lubrication Surfaces or Condensing Centrifugal Washers.*

*Primary Examiner*—Dana Ross
(74) *Attorney, Agent, or Firm*—Emch, Schaffer, Schaub & Porcello Co., L.P.A.

(57) ABSTRACT

In a device on machines, especially machine tools and their parts, such as tool holders comprising at least one rotating element, which is rotatably mounted at least in one bearing position arranged in a housing, a lubricating device is provided for this bearing position. For this, the bearing position is located in a lubricant path, which extends from an inlet to an outlet in the housing and into which there is fed under pressure a lubricant mist, which flows through the lubricant path up to the outlet. The outlet is connected to condensation means for the residual quantity of lubricant mist reaching the outlet, so that only condensed lubricant escapes to the outside. The lubricant mist flowing through the housing effects lubrication and cooling of the bearing position and at the same time effects a pneumatic seal of the housing to the outside to prevent contaminants from penetrating.

31 Claims, 5 Drawing Sheets

U.S. PATENT DOCUMENTS

| | | | |
|---|---|---|---|
| 6,079,090 A * | 6/2000 | Ongaro ........................ 29/27 C |
| 6,122,808 A * | 9/2000 | Popp ............................. 29/49 |
| 6,287,058 B1 * | 9/2001 | Arai et al. ................... 409/132 |
| 6,373,156 B2 * | 4/2002 | Suzuki et al. ................ 409/231 |
| 6,599,066 B1 * | 7/2003 | Koike et al. ................. 409/135 |
| 6,604,269 B2 * | 8/2003 | Jennemann et al. ............. 29/42 |
| 6,623,251 B2 * | 9/2003 | Nawamoto et al. .......... 409/135 |
| 6,729,813 B2 * | 5/2004 | Sahm et al. .................. 409/136 |
| 6,796,756 B1 * | 9/2004 | Kleiner ....................... 409/232 |
| 6,808,342 B2 * | 10/2004 | Kress et al. ................. 409/136 |
| 6,860,683 B2 * | 3/2005 | Choi ........................... 409/136 |
| 6,896,455 B2 * | 5/2005 | Anderson ................... 409/233 |
| 6,913,390 B2 * | 7/2005 | Inoue et al. ................. 409/231 |
| 7,125,208 B2 * | 10/2006 | Schweizer et al. .......... 409/136 |

* cited by examiner

METHOD AND DEVICE FOR LUBRICATING BEARING POSITIONS, ESPECIALLY IN MACHINE TOOLS OR THEIR PARTS

BACKGROUND OF THE INVENTION

The invention relates to a device on machines, especially machine tools, comprising at least one rotating element, which is rotatably mounted in a bearing position arranged in a housing, and a lubricating device for this bearing position that can at least intermittently supply the bearing position with a lubricant. The invention additionally relates to a method for lubricating elements surrounding bearing positions and/or gear means, especially in machines tools or their parts.

SUMMARY OF THE INVENTION

For example, toolholders for driven tools on tool carriers, such as tool turrets of CNC-controlled machine tools, are in principle small spindle units adapted to the work space and working conditions. They are used for stationary and rotating tools, the toolholders for rotating tools generally not having their own drive, but being driven by a power source coming from the tool carrier. Due to their confined spatial relationships, such as those prevailing on a turret disk, such toolholders have very limited space and are subject to extreme working conditions, the trend being toward higher and higher spindle speeds (30,000 RPM and more). These considerations also keep raising the requirements on bearings and gear parts, especially on their lubrication and cooling, while at the same time the question of providing a perfect seal against the conditions prevailing in the work space for the bearing positions and gear parts arranged in the housing keeps gaining in importance, since the penetration of coolant into the housing can rapidly impair functional reliability.

The currently customary lubrication intervals and lifetime lubrication of bearing positions often no longer suffice for these high stresses. Although there are efforts to relieve the tools engaging the workpiece, the work space and the environment from excessive stresses caused by coolants, cutting oils and the like by means of minimum quantity lubrication, this does not solve the problem of efficient lubrication and cooling and any required housing seal for high-speed tools, such as in toolholders.

Fundamentally similar problems are quite generally appearing to a growing extent in machine tools and their aggregates, which are operating with higher and higher spindle speeds like those required for modern machining operations. Here too, less and less adequate lubrication and cooling of the bearing positions and gear parts while stresses are increasing is leading to an undesirable decrease in lifetime or to impaired functional reliability.

The object of the invention is therefore to increase the functional reliability and lifetime in machines, especially in machine tools and here especially in toolholders having driven, very high-speed spindles.

In the novel device, which demonstrates for example a toolholder comprising a toolholder housing and a spindle, which is rotatably mounted in the toolholder housing and can be coupled to a power source, at least one lubricant path, which extends from an inlet to an outlet and contains the respective bearing position and/or a lubricant supply chamber associated with the bearing position, is configured in the housing. A lubricant-mist generation device is connected to the inlet and feeds the lubricant mist into the lubricant path under pressure, the lubricant mist flowing through the lubricant path up to the outlet. The outlet is connected to condensation means for the residual lubricant mist reaching the outlet, which lubrication means condense the lubricant mist so that discharge means, configured as an outlet bore for example, can simply collect or otherwise dispose of the now-condensed lubricant that reaches the outside.

As a rule, oil that can be atomized with air comes into consideration as lubricant, but other atomizable lubricants, such as powdered lubricants, are also basically conceivable. The generation of the lubricant mist also does not unconditionally have to occur with air. Cases in which it is advantageous to use a gas, such as nitrogen, for the atomization are also conceivable.

According to the invention, in place of the customary lubrication intervals and lifetime lubrication, there is performed a lubricant-mist lubrication of the bearing positions and gear means, such as in toolholder housing, in which lubricant mist, which supplies the bearing positions and gear means with the amount of lubricant required for high stress and also results in very favorable tribological relationships, flows through the housing. Since the lubricant path, from its inlet to its outlet, extends through the entire housing and the lubricant mist consequently flows through the housing, the lubricant mist simultaneously carries off heat and thereby cools the bearing positions and gear means. On the lubricant path, the lubricant mist is under a certain pressure, whereby an overpressure of 1 bar, for example, relative to the atmosphere can be produced. This overpressure in the housing also prevents fine contaminants from the work space, such as coolant or small chip particles, from penetrating the housing, it being possible according to circumstances to "suck" such contaminants into the housing through cleavages in the housing when the temperature relationships and therefore the pressure relationships in the housing change depending on the operation.

It is known to impinge tool carriers, such as tool turrets and toolholders or spindle units on machine tools, with sealing air, generating a slight overpressure inside the housing relative to the work space and making it more difficult for chips or coolant or lubricant to penetrate. But such an impingement of sealing air causes an extra expense, which is saved in the device according to the invention, because the lubricant mist, which flows through the housing and is under pressure according to the invention, simultaneously creates a sealing effect in the spirit of sealing-air impingement and thereby effects a pneumatic seal against the work space.

The condensation means of the device according to the invention are connected to the outlet of the lubricant path and prevent the lubricant mist flowing through the lubricant path from escaping into the environment and thereby impairing the operability or function of the tools and workpieces or leading to environmental pollution. The condensation means cause the residual lubricant to condense automatically with no additional measures being required. The condensation means can be integrated into the housing, be built onto the housing or be arranged separated from the housing. In a particularly structurally simple embodiment, they can demonstrate at least one chamber located in the lubricant path, this chamber being provided with condensation surfaces that the lubricant mist flows around and that are connected to the discharge means, possibly in the form of a discharge line or a simple discharge bore, for the condensed lubricant. In one embodiment, these condensation surfaces can be arranged on spheres that are arranged in the chamber.

The arrangement of the lubricant path through the housing is conditioned by the structural organization and the arrangement of the bearing positions and gear means to be lubricated with lubricant and also depends to some extent on the local circumstances of the housing seals when the explained pneumatic sealing against the work space is of special importance. The lubricant path can run unbranched from one inlet to one outlet, but it is frequently advantageous to branch the lubricant path and provide a plurality of outlets and/or inlets. Accordingly, separate condensation means can also be associated with the separate outlets, and it is also possible to supply the plurality of inlets either from a single lubricant-mist generation device or else to divide up the supply among a plurality of lubricant-mist generation devices operating in parallel.

In the depicted application of the invention on a toolholder, which is used in a tool carrier, such as in the form of a tool turret, it is advantageous for the lubricant path to also extend through the tool carrier so that an inlet is provided on the tool carrier or a part associated with the tool carrier. In this manner, it is possible to simultaneously achieve appropriate lubrication, cooling and pneumatic sealing of gear means, bearing positions and the like, including within the tool carrier. If necessary, the lubricant path can be branched in such a manner that the tool carrier is provided with its own outlet, to which its own condensation means are associated.

Further advantages and embodiments of the invention are subject matter of dependent claims.

BRIEF DESCRIPTION OF THE DRAWINGS

The drawings present exemplary embodiments of the subject matter of the invention. It shows.

DETAILED DESCRIPTION OF THE PREFERRED EMBODIMENT(S)

Figure 1:
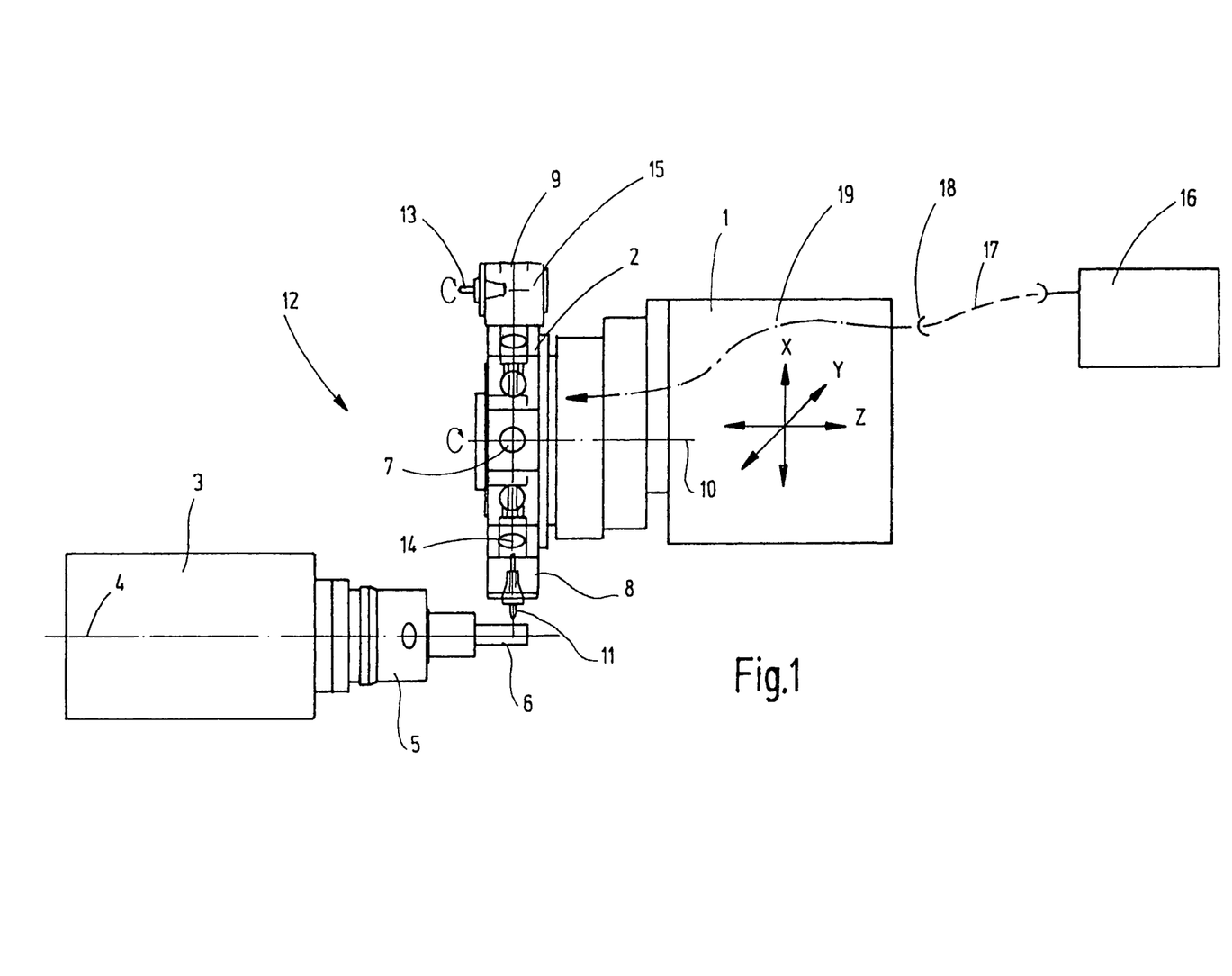
FIG. 1 a schematic representation of a machine tool in the form of a CNC lathe comprising a tool turret and toolholders according to an embodiment of the invention in a top view, FIG. 2 a cutout of the tool carrier of the machine depicted in FIG. 1, illustrating a toolholder in longitudinal section, in a side view and rotated 90° relative to FIG. 2.

In the largely schematic representation of a CNC lathe, only the essential parts of the machine are illustrated in FIG. 1. The lathe demonstrates a tool turret 1, which bears, as actual tool carrier, a switchable turret disk 2 that travels horizontally along axes X and Z and vertical to the plane of the drawing and to an associated headstock 3 along axis Y. The headstock 3 is equipped with a chuck 5, which surrounds a rotational axis 4 and clamps a workpiece, indicated by 6.

Radially aligned insertion bores 7, into each of which a toolholder with its cylindrical clamping shaft can be inserted, are distributed along the perimeter of the turret disk or general tool-carrier disk 2. Of these toolholders, two toolholders 8, 9 are illustrated, toolholder 8 bearing a tool 11 that runs radial to the swiveling axis 10 of the tool-carrier disk 2 and toolholder 9 being equipped with a tool 13 aligned parallel to the turret axis 10. Both tools 11, 13 are driven in a manner yet to be described and rotate around their respective rotational axis 14 and 15, respectively.

For the sake of clarity, the fastening devices of toolholders 8, 9 to the tool-carrier disk 2 are not illustrated, and to simplify the representation, only the toolholders 8, 9 are inserted into the insertion bores 7.

To the tool turret 1, there is attached an oil-mist generation unit 16, which is connected via a hose pipe 17 to an oil-mist inlet 18, which connects to an oil-mist path 19, only part of this path being indicated in FIG. 1. Proceeding from the inlet 18, the oil-mist path 19 runs through the tool turret 1 to the tool-carrier disk 2 and from there to the toolholders 8, 9, as will still be explained in detail. The oil-mist generation unit 16 generates an oil mist forming a lubricant mist with a droplet size of approximately 1.5 μm by atomizing this corresponding oil with air. It feeds this oil mist via inlet 18 into the oil-mist path 19, which the oil mist flows through in the direction indicated by the arrow. The oil mist flowing through the oil-mist path 19 is under a pressure of approximately 1 bar relative to the surrounding atmosphere of the work space, which is generally located in area 12 near the workpiece 6 and the tools 11 and 13.

Figure 2:
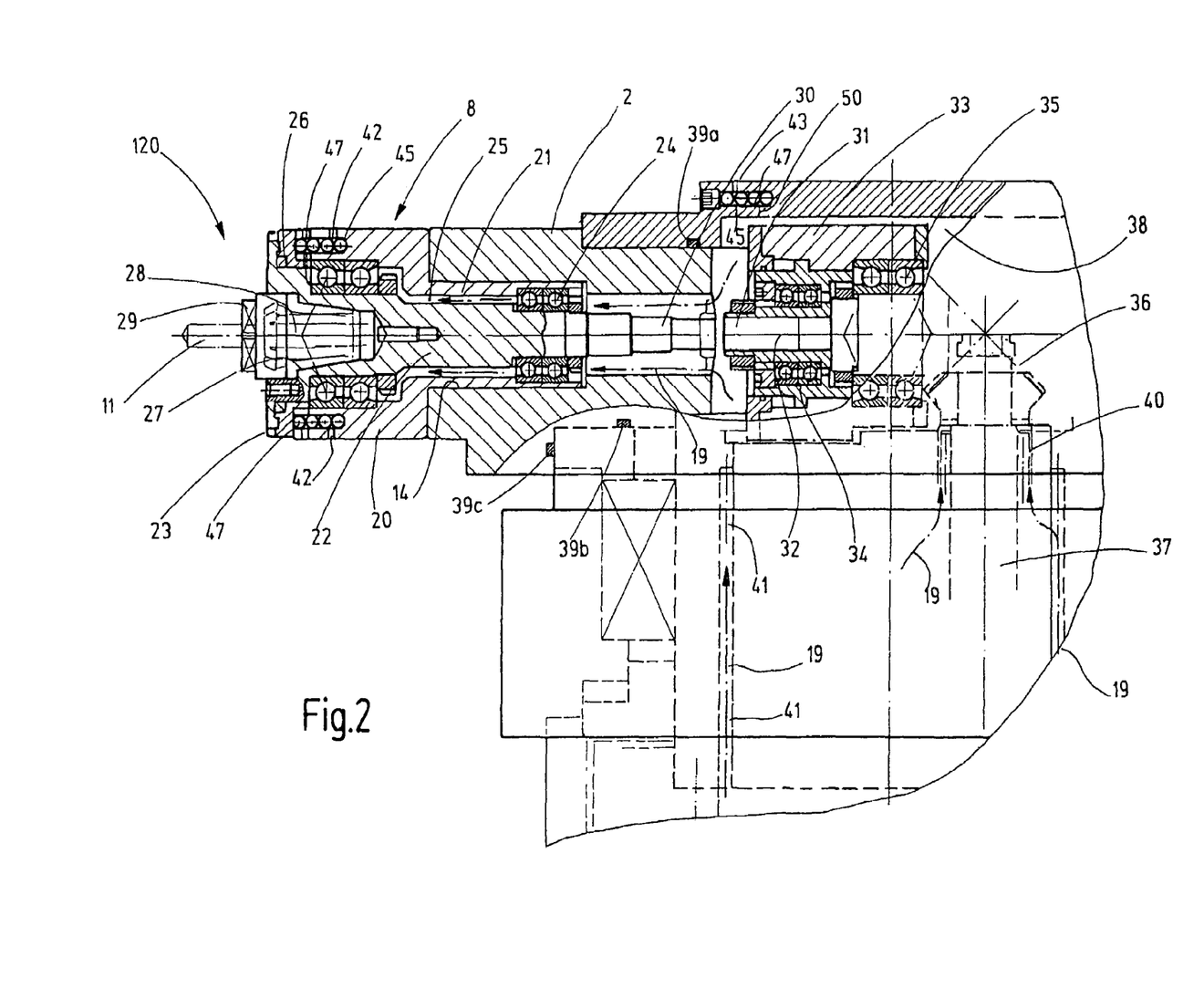

FIG. 2 illustrates a cutout from the tool-carrier disk 2 of the tool turret 1, illustrating the tool holder 8 in greater detail. Tool holder 8 demonstrates a tool holder housing 20, one side of which bears a cylindrical clamping spigot 21, which is inserted into an associated insertion bore 7 of the tool-carrier disk 2. A coaxial tool spindle 22, which is mounted in the housing 20 in a rotatable and axially secured manner on two axially separated bearing positions 23, 24, each demonstrating a pair of ball bearings, extends through the hollow spigot 21. The tool spindle 22, together with the inside wall of the toolholder housing 20, defines an annular space 25, which is sealed toward the work space 120 by a seal 26. The front face of the tool spindle 22 is configured with a cone-shaped insertion hole 27 for a collet chuck 28, into which the tool 11 is clamped by means of a collet nut 29.

The side of tool spindle 22 facing the tool-carrier disk 2 is configured with a coaxial extension 30, which a coupling 31 couples to a coaxial shaft 32, which is rotatably mounted within a housing part 33 of the tool turret 19 on two axially separated bearing positions 34, 35, the tool-carrier disk 2 being rotatably mounted in this housing part 33. A pair of ball bearings, which support the shaft 32 radially and axially, forms each of the bearing positions 34, 35. The side of shaft 32 facing away from the toolholder 8 is gearingly connected to a shaft 37 by a miter gear 36, the shaft 37 forming a connection to a driving motor (not illustrated) in the tool turret 19. The angular gear 36 forming the gear means is accommodated in a hollow space 38 of a housing part of the tool turret 19 located in the oil-mist path 19 and connected to the annular space 25 in the toolholder 8. Seals 39a, b, c seal the space 38 against the atmosphere, so that it can be impinged with an overpressure against the atmosphere in work space 120. The oil-mist path 19, which is indicated by dots and dashes in FIG. 2, runs through the space 38 and along the spindle extension 30 in the annular space 25 of toolholder 8, the annular space 25 forming the lubricant inlet in the toolholder housing 20. As indicated, the oil-mist path 19 is multiply branched in order to supply lubricants to the bearing positions 23, 24, 34, 35 located in its path and the angular gear 36 and the other bearing positions 40, 41 of the shaft 37 and tool-carrier disk 2 respectively.

It proceeds from inlet 18 (FIG. 1) branches in the required manner and leads to a plurality of outlets 42, 43 in the toolholder housing 20 and housing part of the tool turret. In the illustrated embodiment, the outlets 42, 43 are in the form of bores, which form the discharge means for condensed oil, as will still be explained in detail. Collecting lines (not illustrated) can be connected to the outlets 42, 43 if necessary, but as a rule the outlets simply flow into the work space 12.

Figure 3:
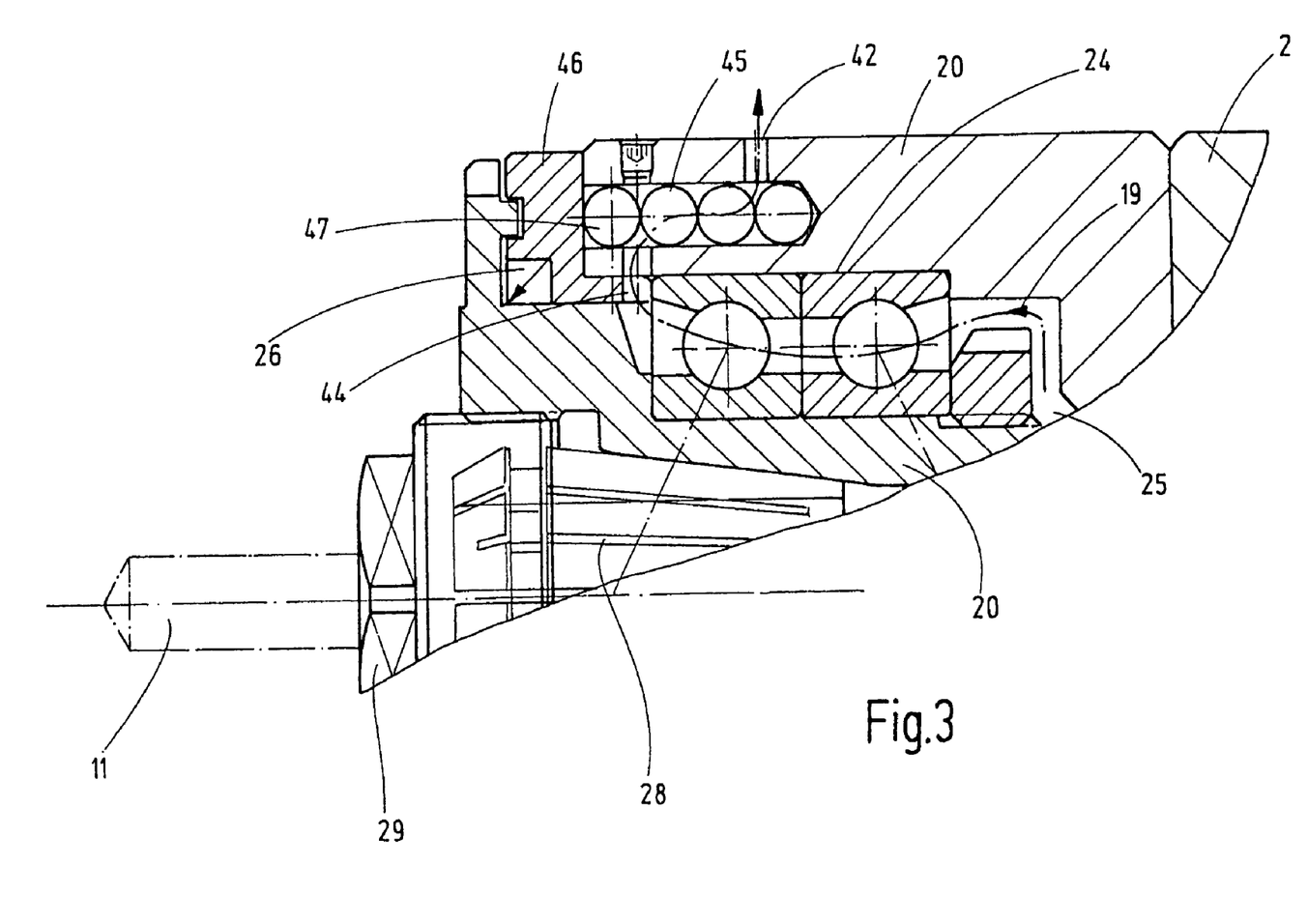
FIG. 3 a cutout of the arrangement depicted in FIG. 2, illustrating the lubricant-mist condensation means in axial cross-section, in a side view and another scale, FIG. 4 a representation similar to FIG. 2, illustrating another toolholder of the machine depicted in FIG. 1, in a corresponding sectional view that is rotated by 90° relative to the representation of FIG. 1, and FIG. 5 the tool carrier of the machine depicted in FIG. 1 top view in a cutout illustrating the two toolholders shown in FIG. 1, each in longitudinal section and top view.

The structural details of the design of one of the outlets 42, 43 is illustrated in detail in FIG. 3 on the basis of one outlet 42:

The oil-mist path 19 passes through the two roller bearings of bearing position 24 and leads, through a radial bore 44, into a cylindrical chamber 45, which is configured in the toolholder housing 20 and has an axis parallel to the rotational axis of the tool 11. An annular cover 46 surrounding the tool spindle 20 seals the front face of the chamber 45. The inlet bore 44 is located in the vicinity of the upper end of chamber 45 adjacent to the cover 46, whereas the radial bore forming the outlet 42 leaves in the vicinity of the opposite, lower end of chamber 45.

A plurality of spheres 47, which are arranged in a common coaxial row and which the oil mist, flowing in the oil-mist path 19 in the direction of the arrow, flows around after leaving bearing position 24, are accommodated in the chamber 45. The bore diameter of the cylindrical chamber 45 is slightly, e.g. 0.05 mm, larger than the sphere diameter, which in one example equals 5 mm. The surfaces of the spheres 47 form condensation surfaces upon which the oil flowing from the bearing position 24 condenses. The number of spheres 47 arranged in a row is therefore adjusted to the residual quantity of oil mist that flows through chamber 45 and the maximum oil concentration, i.e. the mixing ratio oil/air.

In principle, each flow around the spheres produces a pressure drop, cooling occurring at the same time, so that the oil mist condenses and a perceptible atomization of the work space 120 by the oil mist escaping from outlet 42 is prevented.

The chamber 45 and spheres 47 form condensation means that are located in the oil-mist path 19 and connected to the outlet 42. Other condensation surfaces or devices, such as meander-shaped deflection surfaces, labyrinths or the like, could appear in place of the spheres 47.

In the exemplary embodiment presented, the condensation means, as explained, are integrated into the toolholder housing 20, producing particularly simple relationships. But also conceivable are embodiments in which the condensation means are downstream of the outlet 42 in the flow direction of the oil-mist path 19 and are fastened outside to the toolholder housing 20 or are arranged separated from the toolholder 8 or the tool-carrier disk 2.

FIG. 2 shows that, in the illustrated exemplary embodiment, the toolholder 8 demonstrates at least two outlets 42, which are arranged circularly around the clamping sleeve 28 and uniformly distributed in the toolholder housing 20, with upstream condensation means in the form of chambers 45 with spheres 47. There are also embodiments in which there are provided a larger or smaller number of such outlets having associated condensation means. In addition, the outlets and the condensation means also do not need to be arranged in the vicinity of the front face of the toolholder that faces the tool 11. As already mentioned, outlets 43, which are likewise associated with the housing chamber 38 containing the angular gear 36, have corresponding condensation means upstream which, in the illustrated embodiment, again each contain a chamber 45 and spheres 47. The number of these condensation means is also adjusted to the requirements of the special case, inter alia according to the size and shape of the housing chamber 38 which forms a lubricant supply chamber and is connected to the respective chamber 45 via a bore 50 (FIG. 2).

Figure 4:
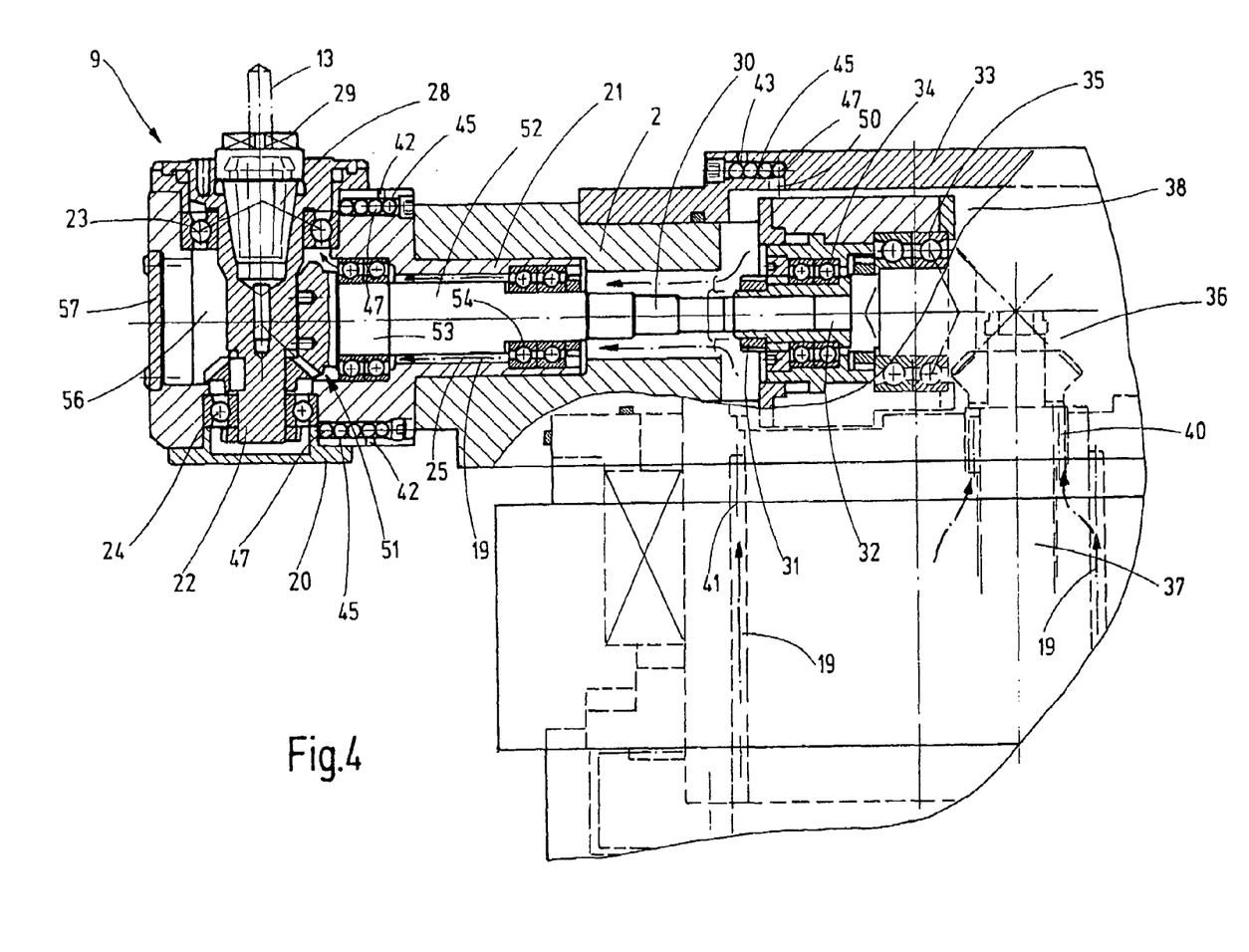

FIG. 4 shows a cutout of the tool-carrier disk 2 and the tool turret 1 depicted in FIG. 1, illustrating the toolholder 9 in longitudinal section. The same parts are provided with the same reference signs as in FIGS. 1 to 3 and will not be explained again.

The axis of the tool spindle 22 in the toolholder 9 is aligned parallel to the rotational axis 10 of the turret head. The tool spindle is again radially and axially mounted in the two axially-separated bearing positions 23, 24, the bearing positions 23, 24 containing ball bearings. In this case however, the toolholder housing 20 contains an angular gear 51, which couples the tool spindle 22 to a drive shaft 52, which runs through the clamping spigot 21 and is rotatably mounted in the clamping spigot 21 and toolholder housing 20 respectively in two axially separated bearing positions 53, 54. Each of the bearing positions 53, 54 contains a pair of ball bearings which mounts the drive shaft 52 radially and axially. The coaxial shaft extension 30, which the coupling 31 couples to the drive shaft 32, again follows the drive shaft 52.

In FIG. 4, the oil-mist path 19, on which the oil-mist flows under pressure to the interior space 38 of the turret housing part and tool-carrier disk 2 and the interior space of the toolholder housing 20 toward the outlets 42 and 43, is only partially illustrated for the sake of clarity. All of the bearing positions 23, 24, 53, 54, 34, 35 and the angular gears 51, 35 and also the bearing positions 40, 41 are located on this oil-mist path 19. Oil mist uniformly flows through all parts, the remaining residual quantity of oil mist condensing on the spheres 47 in the chambers 45 and escaping to the outside in largely condensed form through outlets 42, 43. The interior space 56 of the toolholder housing 20 accommodating the angular gear 51 is likewise located in the oil-mist path 19. It is outwardly sealed by a cover 57.

Figure 5:
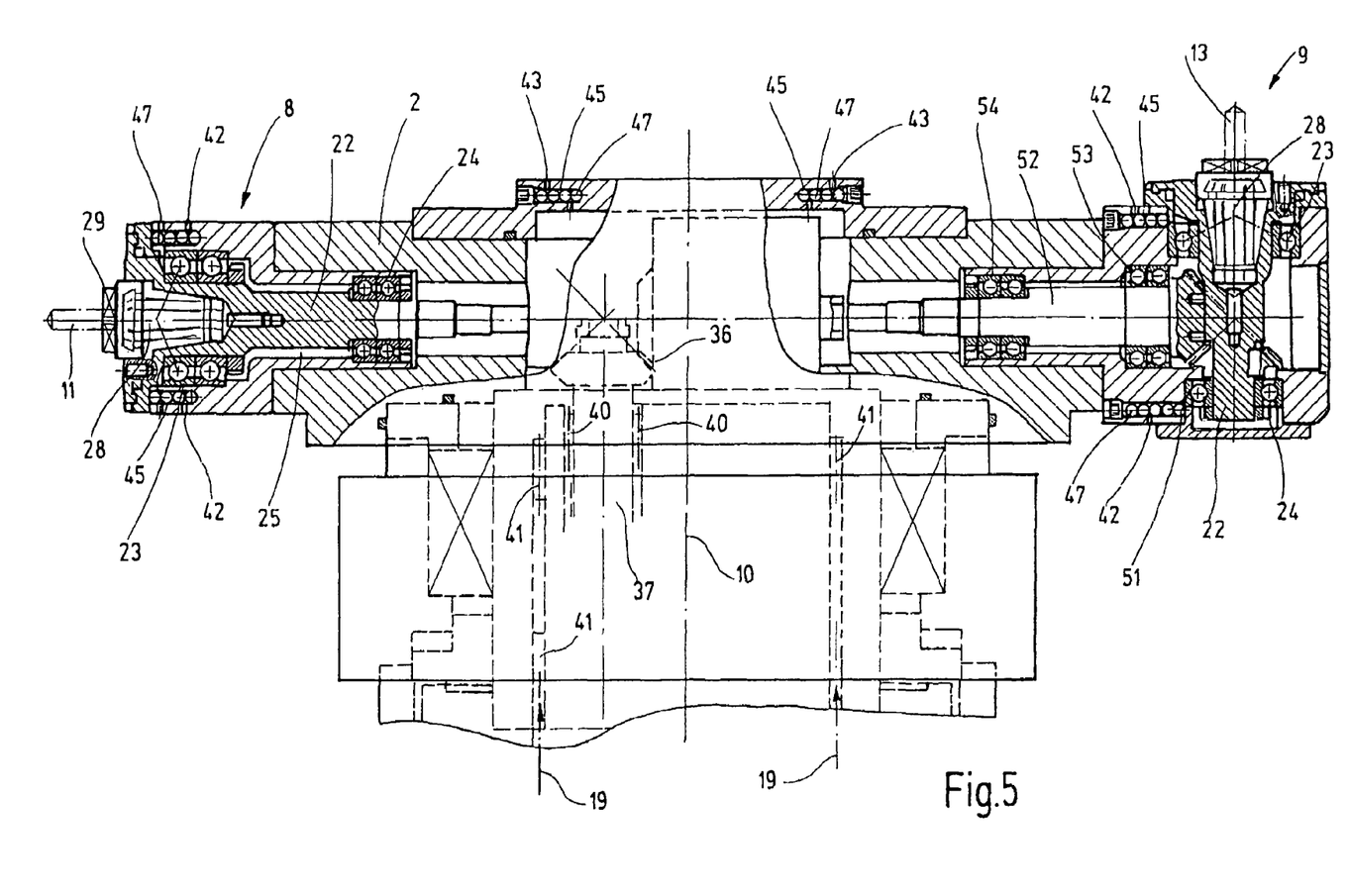

Finally, FIG. 5 illustrates a cutout in greater detail, particularly illustrating the tool-carrier disk 2 of the tool turret 1 depicted in FIG. 1 with the two associated toolholders 8, 9. Parts already explained on the basis of FIGS. 1 to 4 are provided with the same reference signs and will not be described again.

It is clearly evident from FIG. 5, that oil mist, which the oil-mist generation unit 16 (in FIG. 1) feeds into the oil-mist path 19 through the inlet 18, flows through the bearing positions 41, 40, the angular gears 36, through the bearing positions 24, 23 and 54, 53, through the angular gear 51 in the toolholder 9, and finally through the bearing positions 24, 23 in the two tool carriers 8, 9 and through the condensation means 45/47 to the outlets 42. In doing so, the oil mist also flows through the oil-mist supply chambers 38, 25 etc. from which residual quantities flow off through the outlets 43 and the condensation means upstream of them. Not only does the stream of oil mist flowing through the bearing positions and gear means effect the necessary lubricant supply, it also brings about cooling of the bearing positions and gear means at the same time. In addition, the interior spaces 38, 25, 56 of the housing parts of tool turret 1 surrounding the oil-mist path from inlet 18 to outlets 42, 43, and of tool-carrier disk 2 and its associated parts and of toolholders 8,9 are impinged with oil mist under pressure, so that there is an internal overpressure relative to the atmosphere, which effects a pneumatic seal and effectively prevents the penetration of contaminants, such as coolants and lubricants, chips and the like.

The concept according to the invention is, as already mentioned at the beginning, not restricted to toolholders having drive tools. It may be generally used for machines and especially machine tools and their parts in which rapidly running parts like spindles, shafts and the like are present and the matter of concern is to discharge heat from the bearing positions and to achieve a pneumatic seal against the environment.

The oil mist generated by the oil-mist generation unit 16 is constituted in such a manner that it does not essentially change its quality on its path from the inlet 18 to the respective outlet 42, 43 of the oil-mist path. Due to the atomized form, only relatively small quantities of oil are needed for the lubrication, cooling and pneumatic sealing of the bearing positions, gear means, etc. To give an order of magnitude, oil-mist generation unit 16 can be configured to process an oil quantity of approximately 1 liter per month.

I claim:

1. Device for lubricating machines and machine tools, having at least one rotating element (22), rotatably mounted on at least one bearing means (23, 24) in a housing (20) comprising
   - at least one lubricant path (19) in said housing extending from an inlet (18), to an outlet (42, 43) and communicating with said at least one bearing means (23, 24);
   - a lubricant-mist generation assembly connected to said inlet (18) for feeding lubricant mist into the lubricant path under pressure, the lubricant mist flowing through the lubricant path toward said outlet (42, 43);
   - at least one free space (25, 38) in said housing having interior walls and lying in said lubricant path with lubricant-mist flowing therethrough, said space being at least one of a space containing said at least one bearing means or a space for supplying said at least one bearing means with said lubricant-mist, said lubricant-mist directly contacting the walls of said spaces and bearing means contained therein to thereby cool the walls of said spaces and cool and lubricate said bearing means; condensation means (45, 47) for condensing unused lubricant-mist to prevent said mist from reaching said outlet; and discharge means for lubricant condensed in said lubricant condensation means.

2. Device according to claim 1, characterized in that said machine tool comprises a toolholder (8, 9) having a toolholder housing (20) and a spindle (22), which is rotatably mounted in said toolholder housing and can be coupled to a power source.

3. Device according to claim 2, characterized in that the spindle (22) is rotatably mounted on at least two axially separated bearing means (23, 24) comprising roller bearing means and that the lubricant path (19) extends through said roller bearing means.

4. Device according to claim 3, characterized in that the spindle (22), together with the toolholder housing (20), defines an annular space (25) which surrounds the spindle and is located in the lubricant path (19) and can be uniformly supplied with lubricant.

5. Device according to claim 2, characterized in that a drive shaft (52) is rotatably mounted within said toolholder housing (20) on at least two axially separated bearing means (53, 54), which drive shaft gear means (51) is coupled through gear means to said spindle (22), and that the bearing means of the drive shaft are also located in the lubricant path (19).

6. Device according to claim 5, characterized in that bearing means (53, 54) of the drive shaft (52) comprises roller bearing means that are located in lubricant path (19).

7. Device according to claim 6, characterized in that said inlet (at 25) is within the toolholder housing lying coaxial to said drive shaft (52).

8. Device according to claim 5, characterized in that said drive shaft (52), together with the toolholder housing defines an annular space (25), which is located in the lubricant path (19) and is uniformly supplied with lubricant-mist.

9. Device according to claim 5, characterized in that said bearing means (53, 54) of the drive shaft (52) and said bearing means (24, 25) of the spindle (22) are arranged in the lubricant path (19) lying one after the other in the flow direction of the lubricant mist and that the gear means (15) are arranged in a space (56) in the toolholder housing (20), and said space is located in the lubricant path.

10. Device according to claim 2, characterized in that said inlet is configured within the toolholder housing lying coaxial to said spindle.

11. Device according to claim 2, characterized in that the device comprises a tool carrier (2) in which at least one toolholder (8, 9) is detachably inserted and that the lubricant path (19) extends through the tool carrier (2) and toolholder (8, 9), and the tool carrier has at least one lubricant inlet (38) to which said lubricant-mist generation assembly (16) is connected.

12. Device according to claim 11, characterized in that said tool carrier (2) has at least one outlet (50) which is connected to condensation means (45, 47) that comprise said discharge means (43) for the lubricant-mist condensed in said condensation means.

13. Device according to claim 11, characterized in that drive means (32, 36, 37) are rotatably mounted in the tool carrier (2) on at least one bearing means (34, 35, 40) and the tool carrier (2) contains at least one lubricant-mist supply chamber (38) associated with this bearing means, and that the bearing means and/or the lubricant supply chamber is located in the lubricant path (19).

14. Device according to claim 13, characterized in that the drive means comprise gear means (36), mounted on the tool carrier in a space (38) in the tool carrier located in the lubricant path (19).

15. Device according to claim 2 further including a tool carrier rotating about a first axis, said tool carrier having a plurality of cavities, said toolholder mounted in one of said cavities such that its spindle rotates about a second axis and further including a second tool holder mounted in a second of said cavities, said second tool holder having a spindle rotatable about a third axis, said second and said third axes being one of an axis which is parallel to said first axis and of an axis which is perpendicular to said first axis.

16. Device according to claim 2 further including a tool carrier rotating about a first axis, said tool carrier having a plurality of cavities, said toolholder mounted in one of said cavities such that its spindle rotates about a second axis parallel to said first axis and further including a second tool holder mounted in a second of said cavities, said second tool holder having a spindle rotatable about a third axis which is parallel to said first axis.

17. Device according to claim 2 further including a tool carrier rotating about a first axis, said tool carrier having a plurality of cavities, said toolholder mounted in one of said cavities such that its spindle rotates about a second axis perpendicular to said first axis and further including a second tool holder mounted in a second of said cavities, said second tool holder having a spindle rotatable about a third axis which is perpendicular to said first axis.

18. Device according to claim 1, characterized in that the lubricant path (19) is branched and that bearing means and/or gear means are located in branches of the lubricant path.

19. Device according to claim 18, characterized in that the lubricant path has a common inlet (18) for all branches.

20. Device according to claim 1, characterized in that the lubricant path (19) has a plurality of outlets (42, 43), which are connected to branches of the lubricant path.

21. Device according to claim 1, characterized in that said condensation means are arranged in the housing (20).

22. Device according to claim 1, characterized in that said condensation means are arranged separated from the housing (20).

23. Device according to claim 1, characterized in that the condensation means include at least one chamber (45), which is located in the lubricant path (19) and connected to the discharge means (42, 43) and within which are arranged condensation surfaces around which the lubricant mist flows.

24. Device according to claim 23, characterized in that the condensation surfaces are arranged on spheres (47) which are positioned in the chamber (45).

25. Device according to claim 24, characterized in that the spheres (47) are arranged in at least one coaxial row of spheres which is positioned in the chamber (45) with radial play.

26. Device according to claim 1, characterized in that the discharge means (42, 43) flow into the open.

27. Device according to claim 1, characterized in that said lubricant-mist generation assembly (16) is configured to generate a lubricant mist having a droplet size of approximately 1.5 μm.

28. Device according to claim 1, characterized in that the lubricant-mist generation assembly (16) can maintain, in said housing (20), a lubricant-mist overpressure against the atmosphere surrounding the housing.

29. A tool holder (89) in combination with a tool carrier (2) mounted on a tool turret (1), said tool holder being detachably received in a cavity of said tool carrier and having at least one rotating element (22) rotatably mounted on at least one bearing (23, 24) in a housing (20), said combination having lubricating means including at least one lubricant path (19) defined in said tool carrier (2) and said housing (20) and extending from an inlet (18) in said tool carrier (2) to an outlet (42, 43) in said tool holder (8,9) and communicating with said at least one bearing (23, 24);

a lubricant-mist generation assembly (16) connected to said inlet (18) for feeding the lubricant mist into the lubricant path under pressure, the lubricant mist flowing through the lubricant path toward said outlet (42, 43);

at least one free space (25, 38) in said housing and lying in said lubricant path (19) with lubricant-mist flowing therethrough, said space being at least one of a space containing said at least one bearing or a space for supplying said at least one bearing with said lubricant-mist, said lubricant-mist directly contacting the walls of said spaces and bearings contained therein to thereby cool the walls of said spaces and cool and lubricate said at least one bearing;

condensation means (45, 47) for condensing unused lubricant-mist to prevent said mist from reaching said outlet; and discharge means for lubricant condensed in said lubricant condensation means.

30. The combination according to claim 29 further including one or more additional tool holders, each detachably received in one of a plurality of cavities in said tool carrier and each having said lubricating means.

31. The combination according to claim 28 wherein said tool carrier rotates about an axis and at least one of said tool holders is positioned in a cavity such that its rotating element (22) rotates about an axis parallel to said tool carrier axis and at least one other of said tool holders is positioned in a cavity such that its rotating element rotates about an axis perpendicular to said tool carrier axis.

* * * * *